US005310988A

United States Patent [19]

Couch, Jr. et al.

[11] Patent Number: 5,310,988

[45] Date of Patent: May 10, 1994

[54] ELECTRODE FOR HIGH CURRENT DENSITY PLASMA ARC TORCH

[75] Inventors: Richard W. Couch, Jr., Hanover, N.H.; Nichols A. Sanders, Norwich, Vt.; Lifeng Luo, Lebanon, N.H.; Zhipeng Lu, Lebanon, N.H.; Patrik Bäckander, Lebanon, N.H.; John Sobr, Enfield, N.H.

[73] Assignee: Hypertherm, Inc., Hanover, N.H.

[21] Appl. No.: 886,067

[22] Filed: May 20, 1992

[51] Int. Cl.[5] .............................................. B23K 10/00

[52] U.S. Cl. .......................... 219/121.52; 219/121.49; 219/121.39; 219/119; 219/120

[58] Field of Search ...................... 219/121.52, 121.49, 219/121.5, 121.48, 74, 75, 119, 118, 120

[56] References Cited

U.S. PATENT DOCUMENTS

| | | | |
|---|---|---|---|
| 3,930,139 | 12/1975 | Bykhovsky et al. | 219/121.52 |
| 4,133,987 | 1/1979 | Lakomsky et al. | 219/121.52 |
| 4,766,349 | 8/1988 | Johansson et al. | 219/121.52 |
| 4,861,962 | 8/1989 | Sanders et al. | 219/121.5 |
| 4,967,055 | 10/1990 | Raney et al. | 219/121.56 |
| 5,070,227 | 12/1991 | Luo et al. | 219/121.5 |
| 5,097,111 | 3/1992 | Severance, Jr. | 219/121.48 |
| 5,105,061 | 4/1992 | Blankenship | 219/121.520 |

FOREIGN PATENT DOCUMENTS

| | | |
|---|---|---|
| 0370520 | 5/1990 | European Pat. Off. . |
| 2635019 | 8/1975 | Fed. Rep. of Germany . |
| 3802728 | 8/1988 | Fed. Rep. of Germany . |
| 3915024 | 11/1989 | Fed. Rep. of Germany . |
| 57-171366 | 10/1982 | Japan . |

*Primary Examiner*—Mark H. Paschall

*Attorney, Agent, or Firm*—Dike, Bronstein, Roberts & Cushman

[57] ABSTRACT

The diameter of a hafnium insert press fit into the bottom end of a copper electrode varies as a function of the level of current carried by the electrode. The diameter is the minimum necessary to support emission at that current level while also protecting the copper body against attack by the arc. The insert is generally circular and preferably extends completely through the bottom wall to a circulating flow of cooling water at a hollow interior of the electrode. The bottom wall includes an annular recess in a portion of the copper wall surrounding the insert. A coolant inlet tube extends into the recess in a spaced relationship to provide a high flow velocity of the coolant over the interior rear surface of the electrode.

16 Claims, 3 Drawing Sheets

ELECTRODE FOR HIGH CURRENT DENSITY PLASMA ARC TORCH

BACKGROUND OF THE INVENTION

This invention relates in general to plasma arc cutting torches. More specifically it relates to an improved electrode and insert cooling method for use in low current, high definition torches.

In plasma arc cutting of sheet metal and the like using air or oxygen as the plasma gas, it is common to use an insert of a high emissivity material such as hafnium or zirconium press fit into the bottom face of a copper electrode. A current is applied to the electrode. In a transferred arc mode of operation, a pilot arc is typically formed within the torch between the electrode and an adjacent nozzle. The arc then transfers to a workpiece in conjunction with a ramping up of the arc current to a full operating value.

In all electrodes of this type heretofore in commercial use, the insert is cylindrical and has a diameter of about 0.070 inch (17.8 mm) for torches carrying currents varying from 20 to 260 amperes. This value was chosen by Hypertherm, Inc., the assignee of the present application, in the 1980's during the development of a 260 ampere oxygen plasma cutting systems. It has remained the standard insert size ever since.

While the high emissivity of the insert is very desirable, in practice standard electrodes with these inserts exhibit an extremely short life when used at low current levels, e.g. 15 to 70 amperes. This problem is particularly severe for use in high definition torches where the current density is typically three to four times than that of a conventional torch and a strong vortex flow of the plasma gas is used to stabilize the location of the arc. For example, in an early test of a high definition torch using the standard insert size, when the operating current was 15 amperes the hafnium insert exhibited a wear depth of more than 0.030 inch after only 50 cycles of operation. This high wear rate is observed even when using the electrode wear reduction techniques described in U.S. Pat. No. 5,070,227.

It is therefore a principal object of the present invention to provide an electrode for plasma arc cutting torch that operates with a reactive plasma gas at a low operating current level and nevertheless has a useful life several times greater than that obtained with conventional electrodes for the same applications.

Another principal advantage is to provide an electrode and method of cooling the electrode that exhibits significantly improved wear and cut quality.

A further object is to provide an electrode with the foregoing advantages which is also less costly than conventional electrodes for comparable applications.

SUMMARY OF THE INVENTION

A plasma arc torch for cutting metal with a reactive plasma gas such as oxygen or air uses an electrode with a body formed of a high thermal conductive material and an insert of a material with a high thermionic emissivity. The insert is preferably hafnium and the body is preferably copper. The insert is cylindrical and has an emitting surface exposed to the plasma gas. The area (A) required for emitting varies as a function of the maximum operating current (I) carried by the electrode. In order to have higher heat conduction, this emitting area should be the minimum area of the insert. Expressed functionally, the insert has a diameter that is at least coextensive with the molten emission spot produced on the emitting surface by the selected operating current. Preferably it has a slightly larger diameter sufficient to ensure that the arc does not impinge on the adjacent copper body. Expressed mathematically, the current density, which is defined as total current divided by the available emission area, is a constant number. The insert is dimensioned so that its cross-section area is at least equal to, and preferably a little bigger than, the emitting area required by the selected value of the operating current. In a preferred form for use with a low current high definition torch that is water cooled as described herein, the current density is preferably constant at a value of $1.3\times10^5$ amperes/inch$^2$. Allowing for a non-impingement band, the current density in this preferred form is about $6.0\times10^4$ amperes/inch$^2$.

To further improve the cooling of the insert by convection, a flow of a cooling fluid such as water is circulated within the electrode, and in particular across a bottom end wall of the electrode containing the insert. The insert extends completely through the bottom wall to place it in direct contact with the water. The interior bore of the electrode preferably includes an annular recess in the bottom wall that surrounds an upper portion of the insert and an intermediate ring of copper body material. A water inlet tube extends into this recess in a spaced relationship. This "hollowmilled" construction (i) provides a large area heat transmitting surface in direct contact with the water adjacent the insert, (ii) provides high flow velocities for the water at the bottom wall of the torch, and (iii) avoids the presence of vapor blocks, whether within the electrode or at the electrode-coolant interface.

Viewed as a process, the invention involves sizing the insert so that the surface area exposed to the plasma gas is sufficient to sustain a selected operating current without the arc impinging on the copper body and small enough to prevent the insert material from heating to its boiling point. The invention thus involves sizing the insert to maximize conduction cooling via a surrounding high conductivity material. This sizing is preferably used in combination with known convection cooling with a fluid, preferably water, at the interior of the electrode. The cooling fluid is preferably in direct contact with the insert and in a high velocity flow pattern around the insert and a surrounding sleeve of copper.

These and other features and advantages of the present invention will be more readily understood from the following detailed description which should be read in light of the accompanying drawings.

BRIEF DESCRIPTION OF THE PREFERRED EMBODIMENTS

Figure 1:
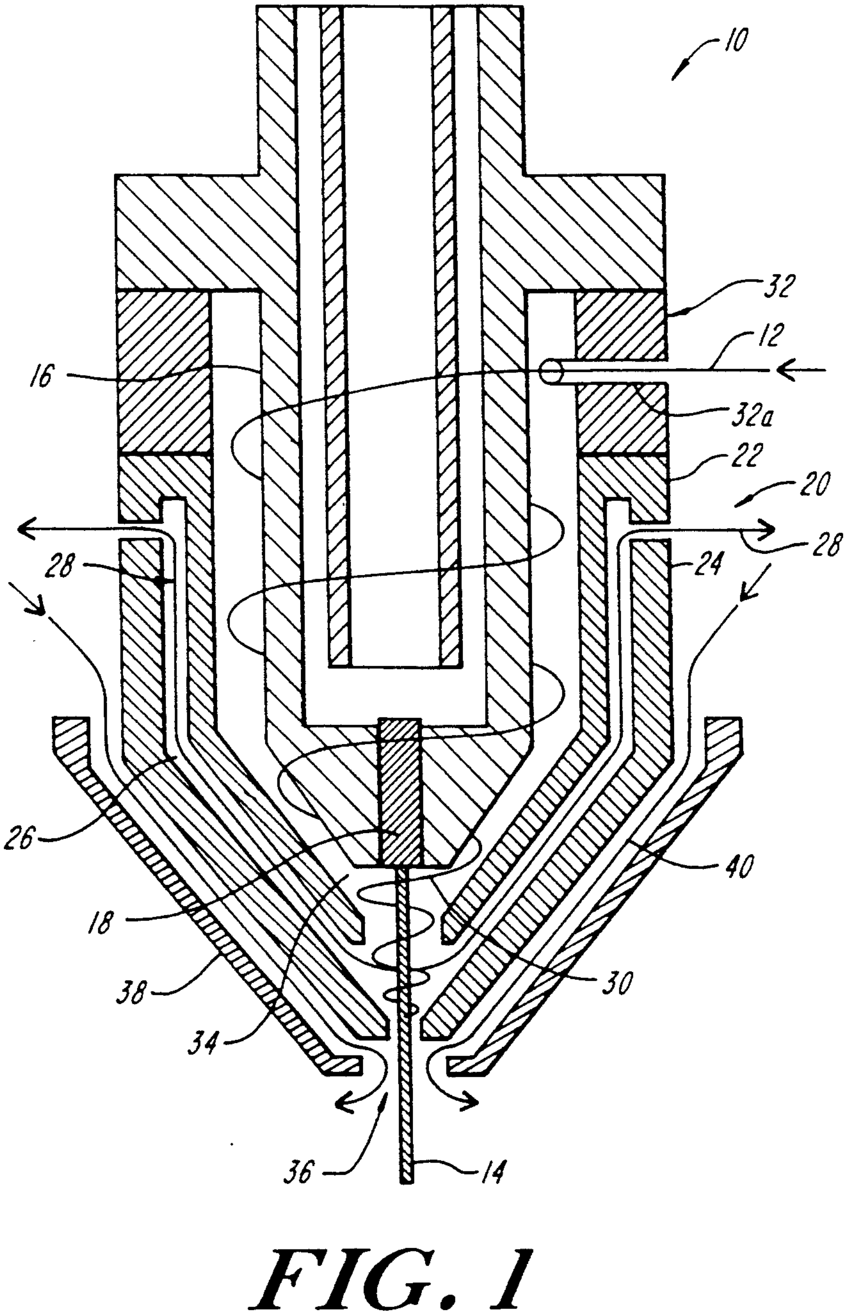
FIG. 1 (PRIOR ART)
FIG. 1 is a view in vertical section of an electrode and nozzle of a high definition plasma arc cutting torch using a conventional prior art electrode.

FIG. 1 shows the front parts 10 of a high definition plasma arc torch developed by Hypertherm, Inc. and identified as its HD-1070 torch. It is designed to pierce and cut metal, particularly mild steel, in a transferred arc mode, but it can be used to pierce, cut, and shape other materials. In cutting mild steel, it operates with oxygen or air as the plasma gas 12 to form a transferred arc 14. An electrode 16, typically formed of copper, has an insert 18 press fit into its lower end 16*a*. The arc 14 is highly constricted; the arc has a current density of 60,000 amperes/inch$^2$, several times a typical current density of 25,000 amperes/inch$^2$ for conventional plasma arc torches.

The front parts include a nozzle 20 having an inner piece 22 and an outer piece 24 with a flow path 26 formed therebetween to divert away a portion 28 of the plasma gas flow 30. A swirl ring 32 has canted ports 32*a* that impart a swirl to the plasma gas flow. This swirl creates a vortex that constricts and stabilizes the arc. The diversion of a portion 28 of the plasma gas flow ensures a strong vortex flow through a plasma arc chamber 34 despite the relatively small cross sectional area of the nozzle exit orifice 36 at the outer nozzle piece 24. This strong vortex flow stabilizes the position of the arc 14 on the insert 18. At low currents, e.g. 15 amperes, the emission spot on the insert 18 is generally circular and has a diameter of about 0.012 inch. A nozzle shield 38 of the general type described in U.S. Pat. No. 4,861,962 guides a flow 40 of a secondary gas onto the arc. The shield and the gas flow 40 protect the nozzle against molten metal splattered onto the torch from the workpiece which can produce gouging or double arcing.

Water is circulated around the outer nozzle 24 and around the electrode 16. The electrode 16 is hollowed as shown with a water inlet tube extending down into the electrode as shown. The insert 18 is generally cylindrical and has a diameter of 0.070 inch (17.8 mm). As noted above, with this construction, when the torch is operated to cut at low currents (15–70 amperes) the electrode exhibits rapid wear. At 15 amperes, the insert shows a pit of 0.030 inch depth after about only 50 starts. This poor wear performance appears despite the use of the wear reduction invention described in U.S. Pat. No. 5,070,227. This '227 invention uses as a model that the insert material is molten during operation and that a strong vortex gas flow blows away the molten material upon arc termination. This model does not, however, explain the wear of the electrode at low currents.

Figure 2:
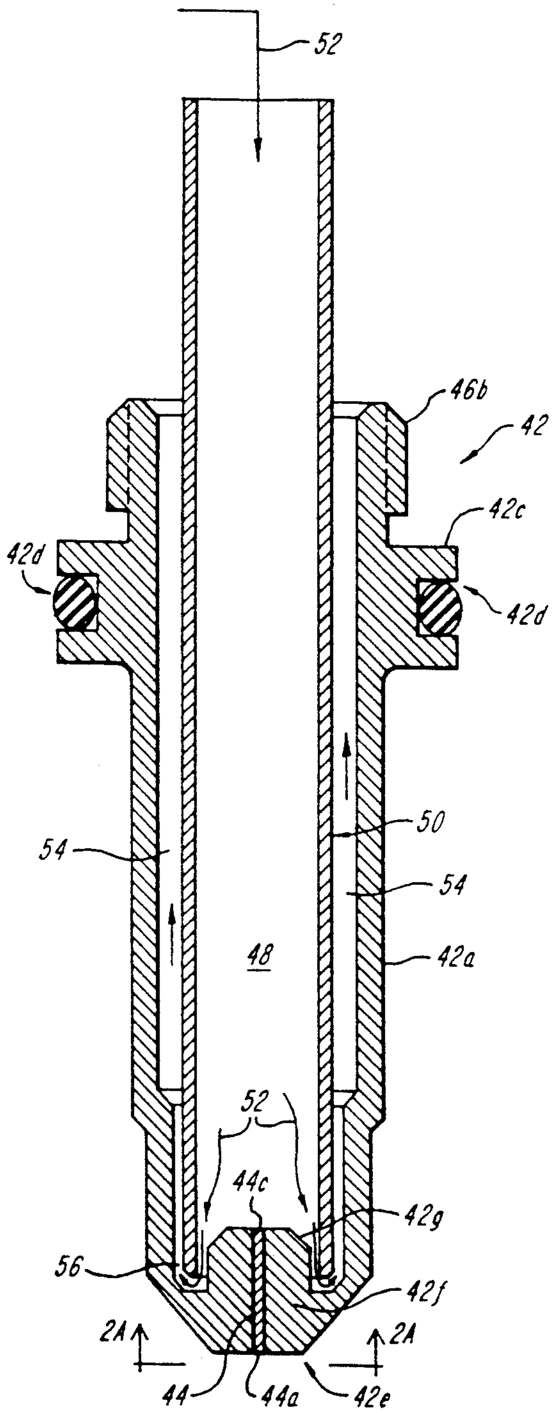
FIG. 2 is a detailed view in vertical section of an electrode constructed according to the present invention.

FIG. 2 shows an electrode 42 according to the present invention suitable for use in the high definition torch shown in FIG. 1. The electrode 42 has a cylindrical body 42*a* that extends along the centerline of the torch when it is installed for use. Threads 42*b* replaceably secure the electrode to a cathode block, not shown, which in turn is connected to the negative terminal of a conventional D.C. power supply, also not shown. A flange 42*c* with an outwardly facing annular recess 42*d* receives an o-ring to provide a fluid seal around the electrode. The lower end of the electrode narrows slightly before its outer surface slopes to a generally planar end surface 42*e* that faces the nozzle exit orifice 36.

An insert 44 of a high emission material, preferably hafnium, is centered on the end face 42*e*. It is generally cylindrical with a circular end surface 44*a* that lies directly over the exit orifice 36 and is exposed to the plasma gas in the chamber 34. The insert 42 is press fit into a suitable bore drilled into a bottom wall 42*f* of the electrode body. The insert 42 serves the same purpose as the insert 18 in the FIG. 1 electrode 16, but its construction differs in two significant ways.

Figure 2A:
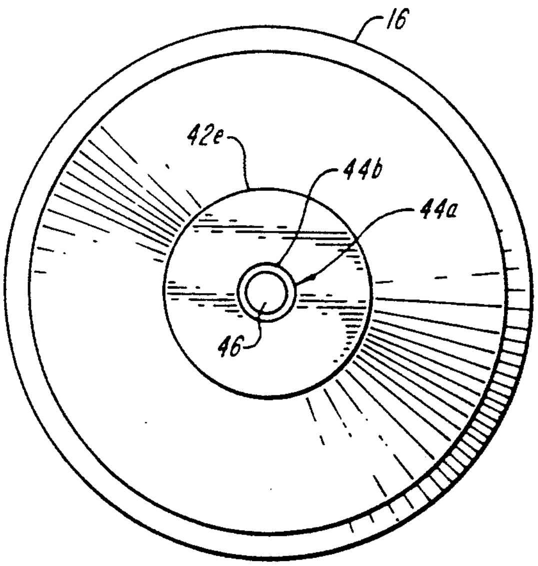
FIG. 2A is an enlarged view along the lines A—A in FIG. 2 showing the bottom end face of the electrode and its insert.

A first principal feature of the invention is that the diameter of the electrode is not constant for all torches and all operating currents, as was the case heretofore. Rather, the diameter coordinates with the value of the operating current (I) carried by the electrode to the transferred arc 14. The relationship between the current I and the area A of the insert emission surface 44*a* exposed to the plasma gas in the plasma chamber 36 vary so that the current density I/A is generally constant. Functionally the diameter of the insert is chosen by at least as large as the emission spot 46 on the insert at the selected current level, but not significantly larger. A narrow annular border 44*b* (FIG. 2A) of insert material is provided around the emission spot to ensure that the arc does not attack the body end surface 42*e* immediately adjacent the insert. The following table shows the results of a series of tests different insert sizes in the electrode 42 for different maximum operating currents in the low current range, about 15 to about 70 amperes.

TABLE I

| | OPERATING CURRENT (amps) | | | |
|---|---|---|---|---|
| | 15 | 30 | 50 | 70 |
| DIAMETER OF EMISSION SPOT (inch) | 0.012 | 0.017 | 0.023 | 0.026 |
| AREA OF EMISSION SPOT (inch$^2$) | $1.13 \times 10^{-4}$ | $2.27 \times 10^{-4}$ | $4.15 \times 10^{-4}$ | $5.31 \times 10^{-4}$ |
| CURRENT DENSITY | $1.3 \times 10^5$ | $1.3 \times 10^5$ | $1.2 \times 10^5$ | $1.3 \times 10^5$ |
| DIAMETER OF INSERT (inch) | 0.018 | 0.025 | 0.032 | 0.038 |

The spot diameter values are the minimum diameters possible for the insert at the given current level and the same, given operating conditions. The preferred insert diameter values listed include the border 44*b*. These values were determined empirically by operating the torch through a life test and then measuring the wear of the insert, both in depth and laterally. The two standard life tests were used. One utilized operating cycles of four seconds on, 10 seconds off. The second test used operating cycles of 1 minute on, 10 seconds off. The electrode 42 reached applicants' life goal of 800 starts for the first test and 240 starts for the second test with an acceptable wear depth of up to 0.040 inch for all of the current levels indicated in the Table. This represents an increase in the life of the electrode over standard electrode designs of about five times.

These empirical test results for the torch, electrode and operating conditions described yield a preferred constant current density (I/A) of the arc rooted at the insert of at least about $1.2 \times 10^5$ amperes/inch$^2$. With a suitable border, ranging from about 0.003 to 0.006 inch (measured radially) for these tests, the constant current density preferably is about $6.0 \times 10^4$ amperes/inch$^2$.

The insert preferably extends axially all the way through the bottom wall 42*f* to a hollow interior 48. A tube 50 introduces a flow 52 of a coolant, preferably water, that circulates through the inside of the electrode, and in particular across the interior or rear surface of the bottom wall 42*f*. The flow exits the electrode via the annular passage 54 defined by the tube and the inner wall of the electrode. The flow rate is preferably 4 to 5 liters per minute at an incoming temperature of less than 40° C.

The electrode is also preferably "hollowmilled", that is, it has an annular recess 56 is formed in the rear surface of the bottom wall 42*c* to enhance the surface area of the body material, preferably copper, in a heat exchanging relationship with the water. The recess also enhances the flow velocity across this rear surface. The rear surface 44*c* of the insert is also in direct contact with the coolant since it extends through the wall. With respect to the recess 56, the excellent heat conduction of copper (398 watts/m° C.) transfers heat effectively in a lateral direction from the hafnium to the coolant. Hafnium exhibits thermal properties (22 watts/m° C.) more like those of an insulator. By having the insert extend completely through the bottom wall, it is believed that an improved heat transfer occurs because there is no thin layer of air trapped under the insert which acts as a layer of insulation.

Figure 3:
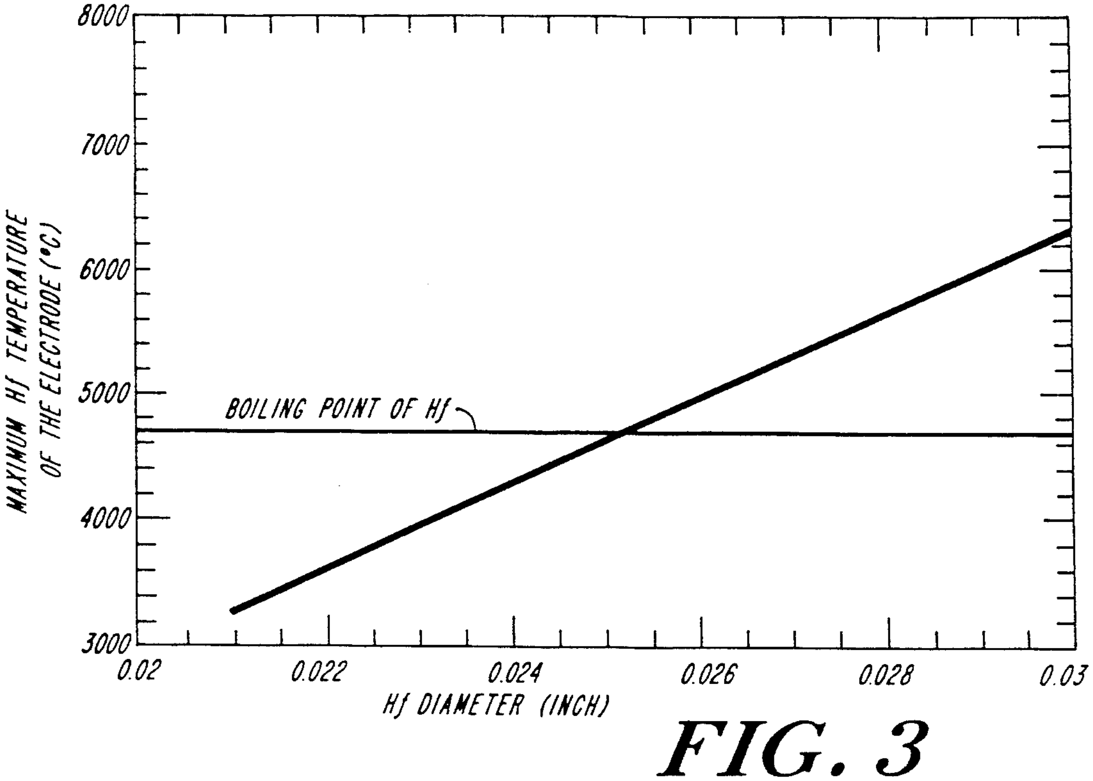
FIG. 3 is a graph showing the maximum temperature of a hafnium insert as a function of the diameter of the insert.

More generally, it is believed that in the prior art the short electrode life at low power levels resulted from a sufficiently poor cooling of the insert at the emission spot that it would boil. In particular, applicants have found that the heating is more strongly related to the diameter of the insert than other factors such as flow rates or coolants. This diameter relationship is shown in FIG. 3. The graph assumes a heat flux which is 3% of the input power (115 volts × 15 amperes). The coolant is water at 4° C.; its flow yields a heat transfer coefficient of 50,000 watts/M° C. The graph demonstrates that for the electrode shown in FIG. 2 operated at a maximum operating current of 15 amperes the internal heat conduction through the electrode to the coolant can keep the insert material from boiling as long as the insert diameter is maintained below about 0.26 inch. More generally, each 0.001 inch in diameter correlates with an increase in the hafnium temperature of about 300° C. FIG. 3 also suggests that the insulating properties of hafnium will cause the emission spot to boil at a 0.070 inch diameter, the present standard insert size. FIG. 3, or a like empirical graph for other torch designs or other operating conditions, provides guidance in selecting the size of the border that can be tolerated without boiling the insert material.

Figure 4:
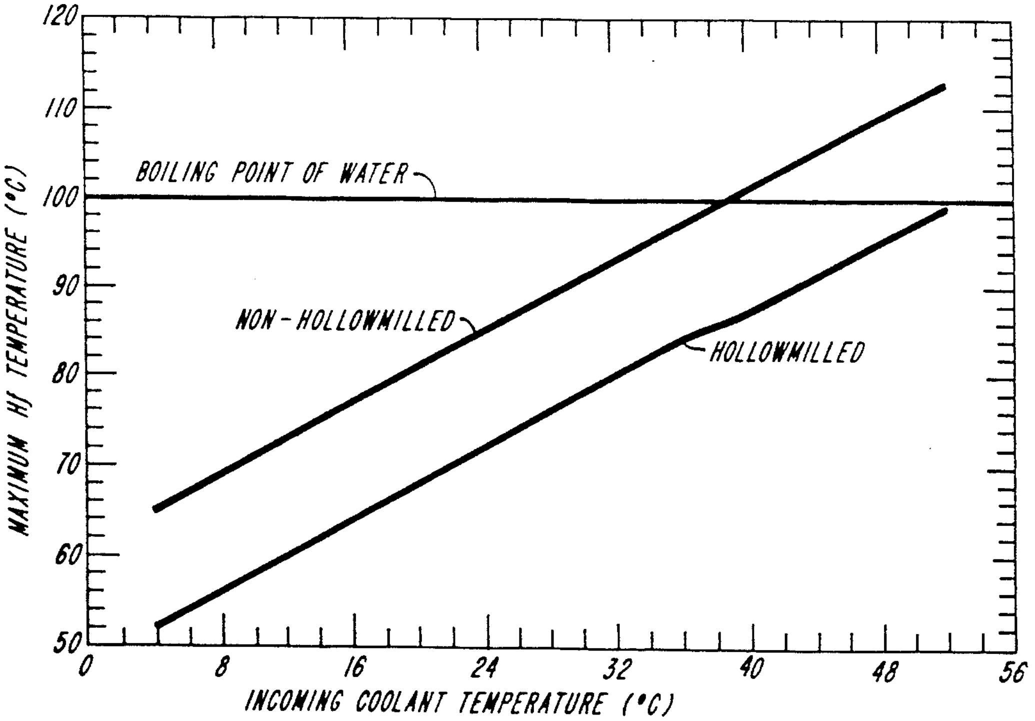
FIG. 4 is a graph showing the maximum temperature of the bottom wall of the electrodes shown in FIGS. 1 and 2 as a function of the temperature of the incoming coolant.

FIG. 4 demonstrates the affect of a hollowmill electrode (FIG. 2) on the temperature at the rear surface of the electrode as compared to a conventional electrode (FIG. 1). For the same operating conditions described above with respect to FIG. 3, the hollowmill design of FIG. 2 decreases the temperature at the rear surface of the bottom wall 42*f* by about 12° regardless of the temperature of the incoming coolant. This is significant since at a temperature of 100° C. the water will boil. Boiling creates a vapor layer between the water and the copper body of the electrode which reduces the heat transfer substantially. The annular recess 56 assists in the cooling by providing a greater surface area for heat transfer and with a narrowed cross-sectional flow area providing an enhanced flow velocity. This heat transfer area is also physically close to the insert, surrounding at least a portion of it. It therefore provides a short, efficient thermal path from the insert to the coolant flow.

By way of illustration, but not of limitation, the electrode 42 is about 1.2 inch long, has a side wall thickness of 0.03 inch and a bottom wall thickness, measured axially, of 0.077 inch. The recess is 0.083 inch wide and the copper body portion extending from the insert to the recess has a diameter of 0.130 inch. The insert also has a length of 0.20 inch. The diameter, of course, varies with the current according to the present invention.

There has been described an electrode and a method of operation of a torch, particularly the method of cooling an insert of hafnium or the like, which greatly extends electrode life when the torch is operated with low currents, e.g. 15 to 70 amperes. This invention is particularly helpful in providing this benefit in the operation of a high definition torch. This invention has also been found to produce a better quality cut as a result of operation with an insert that is less likely to be worn to a point where the wear interferes with the proper operation of the torch. The invention also provides cost advantages. Hafnium is costly. By reducing diametrically the diameter of the insert it is possible to save significantly, despite the fact that the insert 42 is longer than a conventional insert.

While the invention has been described with respect to its preferred embodiment, it will be understood that various modifications and alterations will occur to those skilled in the art from the foregoing detailed description and the accompanying drawings. For example, while the invention has been described with respect to operations with hollowmilled rear surface water cooling, the advantages of this invention can be achieved, albeit to a less effective degree, using only an insert sized according to this invention. Further, while the insert has been described as circular in cross section, it can assume different geometries. Also, it can be formed of a material other than hafnium and the body can be formed of a high thermal conductivity material other than copper. The configuration of the electrode can also assume a wide variety of forms depending on the torch and the application. Further, while the invention has focused on an electrode for operation with an oxygen or air, it can operate with other gases and at other arc current levels. However, the invention has been found to provide the most dramatic improvements at low currents and in high definition torches. It is particularly effective at the difficult, but important, 15 ampere level. These modifications and alterations are intended to fall within the scope of the following claims.

What is claimed is:

1. In an electrode for a plasma arc cutting torch, the electrode having (i) a body formed of a material having a high thermal heat conductivity and extending along the central axis of said torch to a bottom end, and (ii) an insert of a material characterized by a high thermionic emission that is secured in the bottom end of the body with an emissive surface with an area A exposed to the plasma gas and with an emissive spot that becomes molten during cutting, the improvement comprising said insert having its emissive surface area corresponding to the level of the operating current carried by the electrode, said emissive surface area being (i) at least equal to the area of the emissive spot produced by cutting at a given operating current level (ii) sufficiently small that the insert material in said emissive area does not boil, and the size of said emissive spot selected in coordination with the operating current level so that the current density during cutting is substantially constant at a value of at least $1.2\times10^5$ amperes/inch$^2$.

2. The electrode of claim 1 wherein said insert has a generally circular cross section.

3. The electrode of claim 1 wherein said insert is press fit into said body.

4. The electrode of claim 1 wherein said body is hollow except for a bottom end wall that holds the insert.

5. The electrode of claim 4 further comprising means for circulating a cooling fluid in said hollow electrode interior to promote a convection cooling of the bottom wall.

6. The electrode of claim 5 wherein said circulating means comprises an open-ended coolant inlet tube mounted within the electrode in a mutually spaced relationship to define a circulating flow path for said cooling fluid within said electrode with a high velocity flow across said bottom wall.

7. The electrode of claim 4 wherein the insert extends through said bottom wall.

8. The electrode of claim 7 wherein said hollow interior includes an annular recess that surrounds the insert and an intermediate portion of said body and wherein said coolant supply tube extends into said recess.

9. The electrode of claim 7 wherein said coolant inlet tube and said recess define a narrowed flow path for said circulating coolant to increase its flow velocity.

10. The electrode of claim 1 wherein said body is copper and said insert is hafnium.

11. In an electrode for a plasma arc cutting torch, the electrode having (i) a body formed of a material having a high thermal heat conductivity and extending along the central axis of said torch to a bottom end, and (ii) an insert of a material characterized by a high thermionic emission that is secured in the bottom end of the body with an emissive surface with an area A exposed to the plasma gas and with an emissive spot that becomes molten during cutting, the improvement comprising said insert having its emissive surface area corresponding to the level of the operating current carried by the electrode, said emissive surface area being (i) at least equal to the area of the emissive spot produced by cutting at a given operating current level and (ii) sufficiently small that the insert material in said emissive area does not boil, and the diameter of the insert being selected to exceed the diameter of said emission spot by an amount that reliably isolates the arc from the electrode body to produce a constant current density over said insert emissive area of about $6.0\times10^4$ amperes/inch$^2$.

12. A method of extending the life of an electrode of a plasma arc cutting torch, particularly a high definition torch characterized by a high current density and a small diameter emissive spot on an insert of a high thermionic emission material secured in a bottom end of a body of a high heat conductivity material, comprising the step of selecting the area of the insert exposed tot he nozzle to be at least as great as the area of said emissive spot, but not sufficiently large to result in a boiling of the insert material during cutting, and said selecting producing a current density during cutting over said exposed area of about $6.0\times10^4$ amperes/inch$^2$.

13. The method of claim 12 further comprising the step of convection cooling said end wall by circulating a cooling fluid over its interior surface.

14. The method of claim 13 further comprising the step of placing said insert in direct contact with said cooling fluid.

15. The method of claim 14 wherein said circulating and placing lowers the temperature of the interior surface of said insert by approximately 12° C.

16. A method of extending the life of an electrode of a plasma arc cutting torch, particularly a high definition torch characterized by a high current density and a small diameter emissive spot on an insert of a high thermionic emission material secured in a bottom end of a body of a high heat conductivity material, comprising the step of selecting the area of the insert exposed to the nozzle to be at least as great as the area of said emissive spot, but not sufficiently large to result in a boiling of the insert material during cutting, wherein said step of selecting enhances the conduction of heat within said electrode from the insert to said the body while avoiding the impingement of said arc on said body, and wherein said exposed area is generally circular with a diameter in the range of 0.012 inch to 0.026 inch at a current in the range of about 15 amperes to about 70 amperes where said torch is a high definition torch, said body is copper, and said insert is hafnium.

* * * * *